US011765072B2

(12) United States Patent
McDonald et al.

(10) Patent No.: US 11,765,072 B2
(45) Date of Patent: *Sep. 19, 2023

(54) WEIGHTED BANDWIDTH ALLOCATION FOR ADAPTIVE ROUTING

(71) Applicant: Google LLC, Mountain View, CA (US)

(72) Inventors: Nicholas McDonald, Sunnyvale, CA (US); Arjun Singh, Mountain View, CA (US); Moray McLaren, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/508,464

(22) Filed: Oct. 22, 2021

(65) Prior Publication Data

US 2022/0045936 A1 Feb. 10, 2022

Related U.S. Application Data

(63) Continuation of application No. 16/697,339, filed on Nov. 27, 2019, now Pat. No. 11,178,046.

(51) Int. Cl.
*H04L 45/24* (2022.01)
*H04L 45/122* (2022.01)
(Continued)

(52) U.S. Cl.
CPC ........... *H04L 45/24* (2013.01); *H04L 45/122* (2013.01); *H04L 45/124* (2013.01); *H04L 45/22* (2013.01); *H04L 45/42* (2013.01)

(58) Field of Classification Search
None
See application file for complete search history.

(56) References Cited

U.S. PATENT DOCUMENTS 6,456,600 B1 9/2002 Rochberger et al.
7,623,455 B2 11/2009 Hilla et al.
(Continued)

FOREIGN PATENT DOCUMENTS

CN 1735059 A 2/2006
CN 101888330 A 11/2010
(Continued)

OTHER PUBLICATIONS

Hou et al. Multi-Next-Hop Switching Fabric and Scheduling Algorithm. Jun. 15, 2010. Journal of Information Engineering University, vol. 11, No. 3, pp. 261-265.
Notice of Grant for Chinese Patent Application No. 202011071639.0 dated Apr. 13, 2022. 4 pages.
Kumar, Joy and Arnab Chakraborty. "A Review on Cluster based Routing Protocols in MANET." May 2015. International Journal of Digital Application & Contemporary Research. vol. 3 (10). 8 pages.
Huang, Chun-Chieh et al. "Weight-Based Clustering Multicast Routing Protocol for Mobile Ad Hoc Networks." Apr. 2003. International Journal of Internet Protocol Technology. vol. 2. pp. 1112-1117.
(Continued)

*Primary Examiner* — Xavier S Wong
(74) *Attorney, Agent, or Firm* — Lerner David LLP (57) ABSTRACT

Systems and methods of routing are provided. In the system, one or more processors determine that a packet is to be transmitted to a destination. In one or more aspects of the system, the one or more processors select a next port to be used for transmitting the packet by selecting a set of ports among a plurality of ports based on a static weight configuration associated with each port. The next port may be selected from the set of ports based on a number of hops required to reach the destination from each port and based on an estimated latency from each port to the destination. The one or more processors may then route the packet through the selected next port.

10 Claims, 8 Drawing Sheets

(51) Int. Cl.
  *H04L 45/12* (2022.01)
  *H04L 45/00* (2022.01)
  *H04L 45/42* (2022.01)

(56) References Cited

U.S. PATENT DOCUMENTS

| | | | |
|---|---|---|---|
| 7,859,993 B1* | 12/2010 | Choudhury | H04L 45/125 |
| | | | 370/231 |
| 9,143,439 B2* | 9/2015 | Wang | H04L 45/46 |
| 9,246,821 B1 | 1/2016 | Li et al. | |
| 9,461,915 B1 | 10/2016 | Zhou et al. | |
| 10,374,956 B1 | 8/2019 | Tracy et al. | |
| 11,178,046 B2* | 11/2021 | McDonald | H04L 45/124 |
| 2003/0043742 A1 | 3/2003 | De Maria et al. | |
| 2014/0025736 A1* | 1/2014 | Wang | H04L 45/245 |
| | | | 709/204 |
| 2015/0023354 A1 | 1/2015 | Li et al. | |
| 2015/0078375 A1* | 3/2015 | Hendel | H04L 45/7453 |
| | | | 370/389 |
| 2018/0368047 A1* | 12/2018 | Patil | H04W 40/12 |
| 2019/0190816 A1 | 6/2019 | Sharif et al. | |
| 2021/0058334 A1* | 2/2021 | Greth | H04L 47/32 |

FOREIGN PATENT DOCUMENTS

| | | |
|---|---|---|
| CN | 103379042 A | 10/2013 |
| CN | 106062728 A | 10/2016 |
| CN | 106534360 A | 3/2017 |
| CN | 106664250 A | 5/2017 |
| CN | 107580769 A | 1/2018 |
| CN | 108494680 A | 9/2018 |
| CN | 110505148 A | 11/2019 |

OTHER PUBLICATIONS

Karunakaran, S. and P. Thangaraj. "An Adaptive Weighted Cluster Based Routing (AWCBRP) Protocol for Mobile Ad-hoc Networks." Apr. 2008. WSEAS Transactions on Communications. vol. 7 (4). pp. 248-257.
Gojmerac. Ivan et al. "Adaptive Multipath Routing for Dynamic Traffic Engineering." Jan. 2004. IEEE GLOBECOM 2003. vol. 6. 6 pages.
Gojmerac, Ivan et al. "Adaptive Multipath Routing Based on Local Distribution of Link Load Information." Oct. 2003. 10 pages.
Jiawei, Wu et al. "Dynamic and adaptive multi-path routing algorithm based on software-defined network." Sep. 14, 2018. International Journal of Distributed Sensor Networks. vol. 14(10). pp. 1-10.
Carrasquilla, Jairo Enrique Durango. "Hybrid Adaptive Routing." Feb. 14, 2007. Freie Universität Berlin. 7 pages.
Ramasubramanian, Venugopalan et al. "SHARP: A Hybrid Adaptive Routing Protocol for Mobile Ad Hoc Networks." Jun. 1, 2003. Proceedings of the 4th ACM international symposium on Mobile ad hoc networking & computing. pp. 303-314.
Zhou, Junlan et al. "WCMP: Weighted Cost Multipathing for Improved Fairness in Data Centers." Apr. 14, 2014. Proceedings of the Ninth European Conference on Computer Systems. Article No. 5. pp. 1-13.
Extended European Search Report for European Patent Application No. 20210253.9 dated Mar. 4, 2021. 7 pages.
Office Action for Chinese Patent Application No. 202011071639.0 dated Nov. 17, 2021. 8 pages.

\* cited by examiner

WEIGHTED BANDWIDTH ALLOCATION FOR ADAPTIVE ROUTING

CROSS-REFERENCE TO RELATED APPLICATIONS

The present application is a continuation of U.S. application Ser. No. 16/697,339, filed Nov. 27, 2019, the disclosure of which is incorporated herein by reference.

BACKGROUND

To send a packet from a source to a destination in a network, the packet may be routed through a series of switch devices, each of which may have a plurality of output ports. These switch devices and output ports thus provide multiple routes through which the packet may be transmitted. A static or an adaptive routing method may be used to select an optimal route for transmitting the packet. In this regard, a static routing method may choose a route to transmit the packet based on predetermined parameters of the network, such as bandwidth available at each output port at each switch device. However, such static routing methods may not be able to adapt to changing network conditions. For instance, at a given moment, an output port with higher bandwidth may become more congested than an output port with lower bandwidth. In contrast, an adaptive routing method may choose a route to transmit the packet based on network conditions, such as current congestion conditions in the network. However, such adaptive routing methods may not consider predetermined parameters in the overall network. For instance, an output port upstream with lower congestion at a given moment may be selected, but selecting that output port may lead to an output port downstream that has low bandwidth.

BRIEF SUMMARY

One aspect of the technology provides a method for selecting a next port for transmitting a packet, comprising determining, by one or more processors, that a packet is to be transmitted to a destination; selecting, by the one or more processors, a next port to be used for transmitting the packet by: selecting, by the one or more processors, a set of ports among a plurality of ports based on a static weight configuration associated with each port of the plurality of ports; and selecting, by the one or more processors, the next port among the set of ports based on a number of hops required to reach the destination from each port of the set of ports and based on an estimated latency to the destination associated with each port of the set of ports; and routing, by the one or more processors, the packet through the selected next port.

Selecting a set of ports may be based on static weights assigned by weighted cost multipath routing (WCMP).

The method may further comprise repeating, by the one or more processors, the selection of a next port at each hop until the packet reaches the destination.

The method may further comprise categorizing, by the one or more processors, each of the plurality of ports as a primary port or a secondary port based on a number of hops required to reach the destination. Selection of the set of ports may be separately performed for the primary ports and the secondary ports, resulting in a set of primary ports and a set of secondary ports. The next port may be selected among the set of primary ports and the set of secondary ports. The primary ports and the secondary ports may be stored in separate lists accessible by the one or more processors.

The latency may be estimated based on at least one of: a number of hops required to reach the destination, a network congestion condition, and one or more heuristic offsets.

The method may further comprise selecting, by the one or more processors, a first set of ports among the plurality of ports based on the static weight configuration associated with each of the plurality of ports; selecting, by the one or more processors, a second set of ports among the first set of ports based on congestive conditions along routes requiring equal number of hops to reach the destination; selecting, by the one or more processors, the next port among the second set of ports based on estimated latency to destination associated with each port of the second set of ports. The selection of the first set of ports may be separately performed for primary ports and secondary ports, resulting in a first set of primary ports and a first set of secondary ports.

Another aspect of the technology provides a system comprising one or more processors, the one or more processors configured to determine that a packet is to be transmitted to a destination; select a next port to be used for transmitting the packet by: selecting a set of ports among a plurality of ports based on static weight configuration associated with each port of the plurality of ports; and selecting the next port among the selected set of ports based on a number of hops required to reach the destination from each port of the set of ports and based on an estimated latency to the destination associated with each port of the set of ports; and route the packet through the selected next port.

The system may further comprise one or more memories accessible by the one or more processors, wherein information on the plurality of ports are stored in the one or more memories. The one or more processors may be further configured to categorize each of the plurality of ports as a primary port or a secondary port based on a number of hops required to reach the destination, and the one or more memories may store information on the primary ports and the secondary ports in separate lists. The one or more processors may be further configured to perform selection of the set of ports separately for the primary ports and the secondary ports, resulting in a set of primary ports and a set of secondary ports.

The one or more processors may be further configured to select a first set of ports among the plurality of ports based on static weight configuration associated with each port of the plurality of ports; select a second set of ports among the first set of ports based on congestive condition along routes requiring equal number of hops to reach the destination; select the next port among the second set of ports based on estimated latency to the destination associated with each port of the second set of ports.

Yet another aspect of the technology provides for a computer-readable storage medium storing instructions executable by one or more processors for performing a method, comprising determining that a packet is to be transmitted to a destination; selecting a next port to be used for transmitting the packet by: selecting a set of ports among a plurality of ports based on static weight configuration associated with each port of the plurality of ports; and selecting the next port among the set of ports based on a number of hops required to reach the destination from each port of the set of ports and based on an estimated latency to the destination associated with each port of the set of ports; and routing the packet through the selected next port.

The method may further comprise categorizing each of the plurality of ports as a primary port or a secondary port based on a number of hops required to reach the destination. Selection of the set of ports may be separately performed for the primary ports and the secondary ports, resulting in a set of primary ports and a set of secondary ports.

The method may further comprise selecting a first set of ports among the plurality of ports based on static weight configuration associated with each port of the plurality of ports; selecting a second set of ports among the first set of ports based on congestive condition along routes requiring equal number of hops to reach the destination; selecting the next port among the second set of ports based on estimated latency to the destination associated with each port of the second set of ports.

The method may further comprise repeating the selection of a next port at each hop until the packet reaches the destination.

DETAILED DESCRIPTION

The technology relates generally to routing packets in a network. In this regard, when a packet at a node in the network is to be transmitted, one or more processors at the node may select a next port to be used for transmitting the packet based on both static and adaptive routing parameters. For instance, a set of ports may be selected among a plurality of ports based on static weight configurations associated with each port of the plurality of ports. Then, the next port to be used for transmitting the packet may be selected among the set of ports based on estimated latency to the destination associated with each port of the set of ports under current network conditions.

Figure 1:
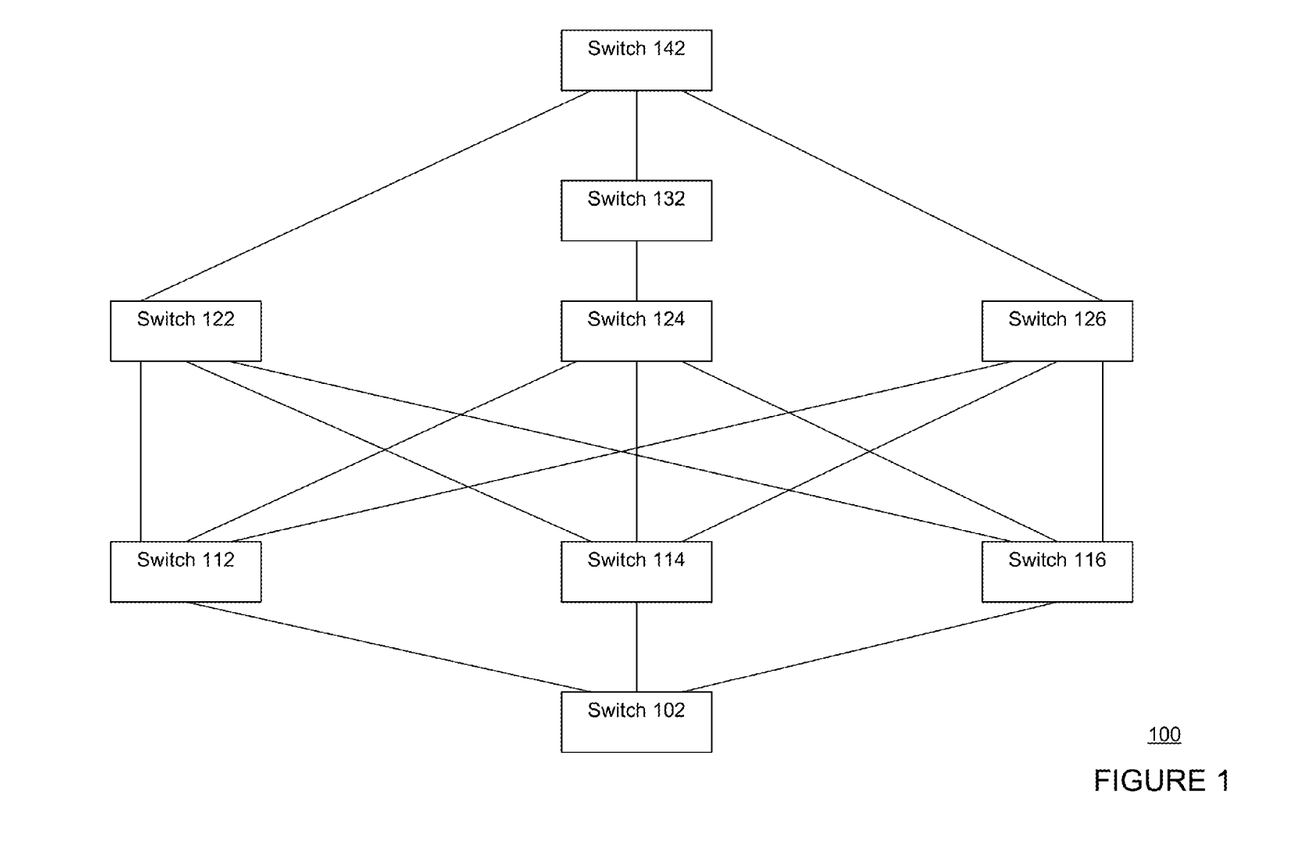
FIG. 1 is a schematic diagram of a network according to aspects of the technology.

FIG. 1 illustrates a network 100 according to aspects of the technology. As shown, the network 100 comprises a plurality of switches 102, 112, 114, 116, 122, 124, 126, 132, and 142. Each of the switches 102-142 may be provided at a node of the network 100, such as coupled to a server computing device or other computing device, for routing data packets to other nodes of the network 100. While only a few switches 102-142 are shown, it should be understood that the network 100 may be expanded to include any number of switches, for example, to reach a greater number of nodes or locations, or to accommodate greater amounts of network traffic.

Each switch 102-142 may be coupled to one or more of the other switches in the network 100, forming one or more routes. For example, a number of routes are shown between switch 102 and switch 142. A packet may be transmitted between switch 102 and switch 142 via any of these routes. For instance, one route may include switches 102, 112, 122, and 142, another route may include switches 102, 114, 124, 132, 142, yet another route may include switches 102, 116, 126, and 142, and still another route may include switches 102, 112, 124, 132, 142, etc. Thus, some routes between switch 102 and switch 142 may require a packet to be transmitted via a greater number of hops than others. In this regard, the routes that require a minimal number of hops, such as those through switch 122 and switch 126 (e.g., 3 hops), may be referred to as "minimal routes" or "primary routes," and the routes that require a greater number of hops, such as those through switch 124 shown (e.g., 4 hops), may be referred to as "non-minimal routes" or "secondary routes."

Figure 4:
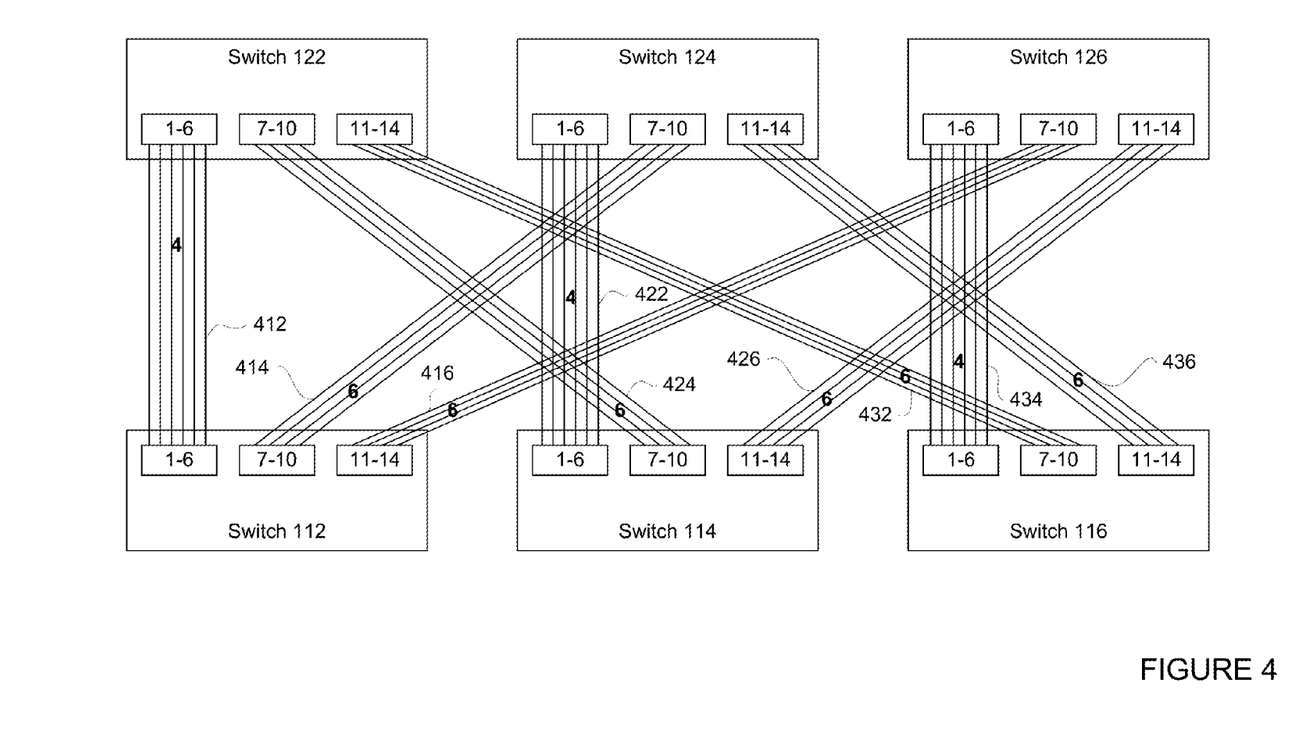
FIG. 4 illustrates an example static weight configuration according to aspects of the technology.

The switches 102-142 may be coupled via data ports (not shown in FIG. 1, examples are shown in FIG. 4). Each switch 102-142 may include a predetermined number of data ports. The number of data ports may vary depending on, for example, a type of switch used. Some ports may be dedicated to downlink traffic (e.g., for transmitting data from switch 112 to switch 122), while others may be dedicated to uplink traffic (e.g., for transmitting data from switch 112 to switch 102). Alternatively or additionally, some ports may be dedicated to ingress while others may be dedicated to egress. The number of data ports may also dictate the number of links that may be established with other network devices, such as with other switches. In some instances, ports may be assigned weights based on the network topology, which is described further in reference to FIG. 4.

Although only a few routes are shown connecting switch 102 to switch 142, additional routes may be available. The additional routes may be formed by additional connections between the switches shown in FIG. 1, or may involve additional switches not shown in FIG. 1. Further, some of the routes shown may be active routes where all ports along the route are active, while others shown may be inactive routes where one or more ports along the route are inactive.

Figure 2:
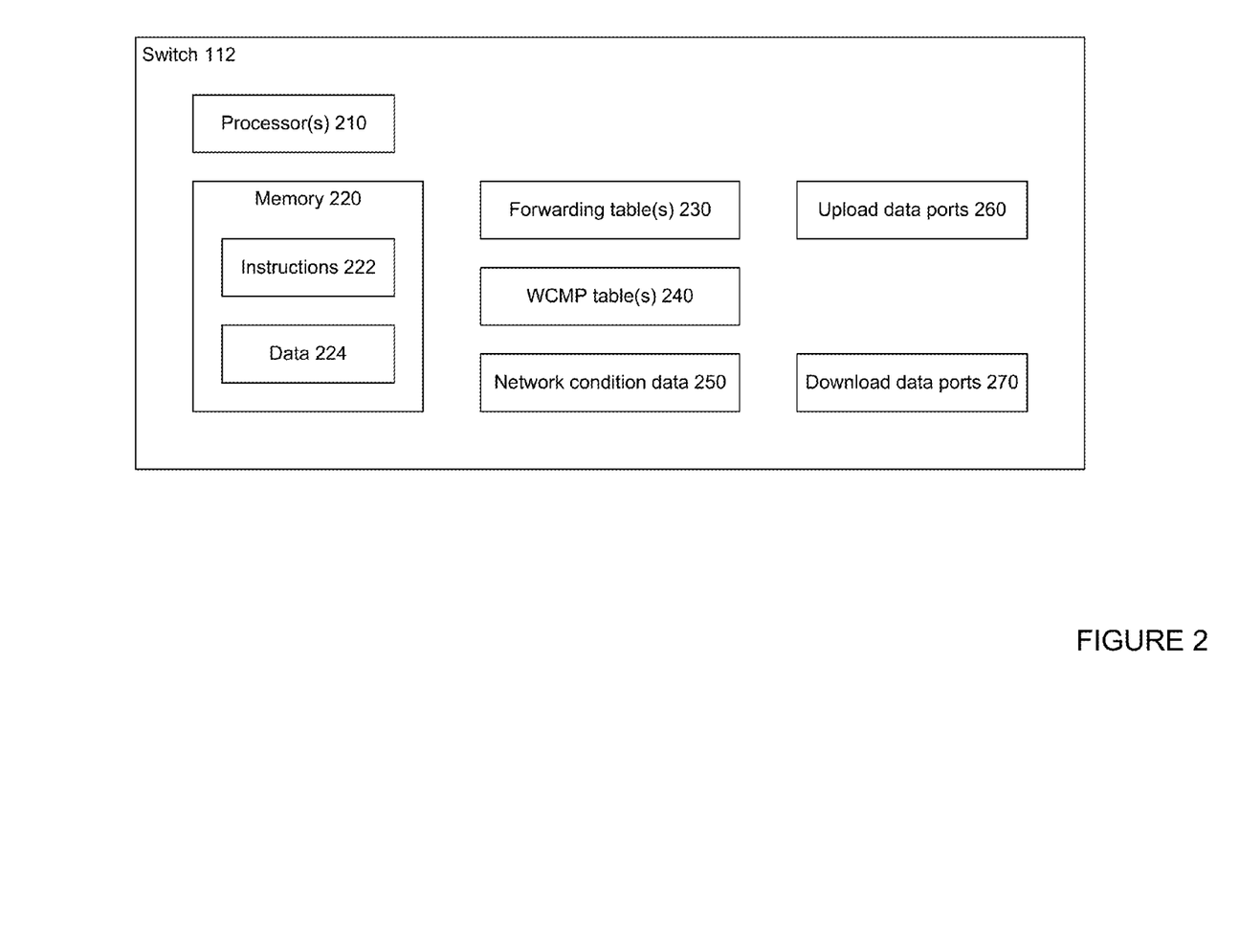
FIG. 2 is a block diagram of a switch according to aspects of the technology.

The switches 102-142 may be routers, chips, or any other type of device capable of receiving packets at a first port and transmitting the packets through a second port, and in many instances, capable of receiving and transmitting packets between multiple ports. FIG. 2 illustrates an example of a switch, such as the switch 102. The switch 102 may comprise one or more processors 210 and a memory 220 coupled to the one or more processors 210. The memory 220 may include instructions 222 and data 224. The switch 102 may further comprise a number of data ports, such as uplink data ports 260 and downlink data ports 270.

Figure 5:
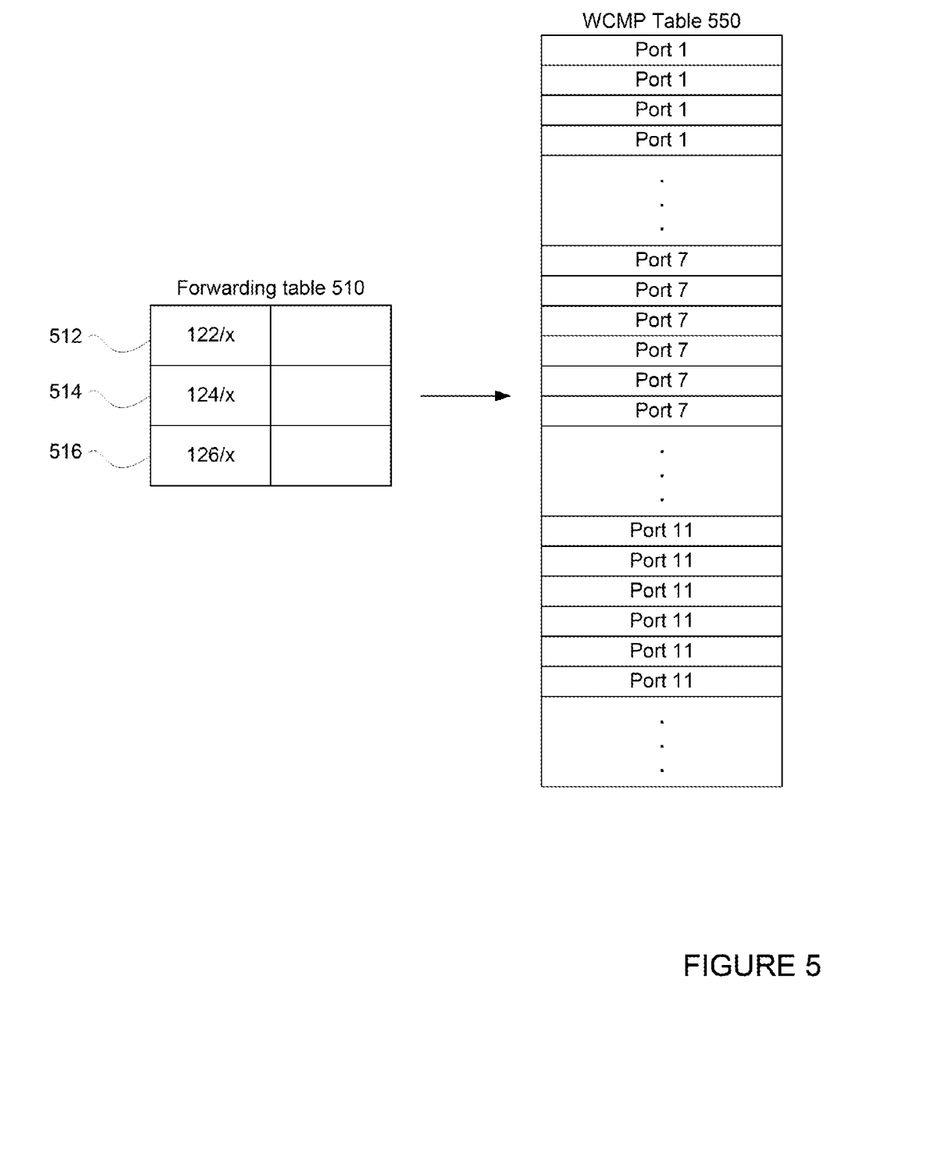
FIG. 5 is an example of routing tables according to aspects of the technology.
Figure 6:
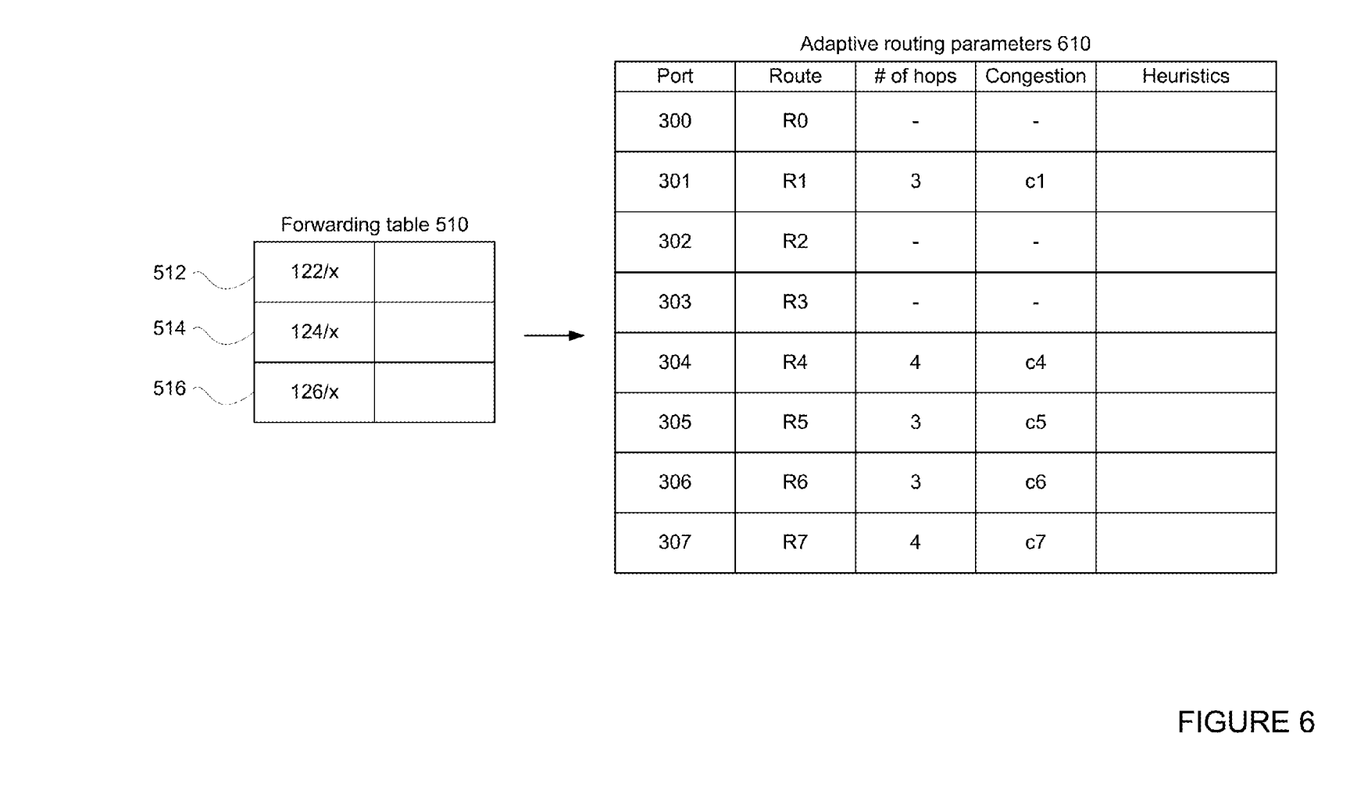
FIG. 6 illustrates example network condition data according to aspects of the technology.

The switch 102 may also include one or more forwarding tables 230, one or more static weight configuration tables such as Weighted Cost Multi Path (WCMP) tables 240, and network condition data 250, which are described further in reference to FIGS. 5 and 6. For example, the forwarding tables 230 may include a number of entries, each listing a key and an action. As packets are received by the switch 102, header information in those packets may be matched against the keys of the forwarding table 230 to determine a corresponding action (e.g., a next hop). The WCMP table 240 may, for example, include a weighting of each of the uplink data ports 260 (and/or downlink data ports 270) on the switch 102, and may be used to determine which port the packet should be transmitted through. The network condition data 250 may include real time or recent network congestion information at various data ports in the network 100. While the forwarding table 230, WCMP table 240, and network condition data 250 are shown as being stored separately from the memory 220, it should be understood that the forwarding table 230, WCMP table 240, network condition data 250, instructions 222, and/or data 224 may be stored in the same medium.

The one or more processors 210 may be any conventional processors, such as processors in commercially available routers. Alternatively, the processor may be a dedicated controller such as an ASIC or other hardware-based processor. The processor and memory may actually comprise multiple processors and memories that may or may not be stored within the same physical housing. For example, memory may be a hard drive or other storage media located in a server farm of a data center. Accordingly, references to a processor, memory, or computer will be understood to include references to a collection of processors, memories or computers that may or may not operate in parallel.

The memory 220 stores information accessible by the one or more processors 210, including instructions 222 that may be executed or otherwise used by the processor 210, and data 224. The memory 220 may be of any type capable of storing information accessible by the processor, including a non-transitory computer-readable storage medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 222 may be any set of instructions to be executed directly (such as machine code) or indirectly (such as scripts) by the one or more processors 210. For example, the instructions may be stored as computer code on the non-transitory computer-readable storage medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 224 may be retrieved, stored or modified by processor 210 in accordance with the instructions 222. For instance, although the system and method is not limited by any particular data structure, the data may be stored in computer registers, in a relational database as a table having a plurality of different fields and records, XML documents or flat files. The data may also be formatted in any computer-readable format. The data may comprise any information sufficient to identify the relevant information, such as numbers, descriptive text, proprietary codes, references to data stored in other areas of the same memory or different memories (including other network locations) or information that is used by a function to calculate the relevant data.

While the components of the switch 102 have been described with respect to a particular switch, it should be understood that a similar architecture may be imparted to any of the other switches of FIG. 1. The switches in the network 100 may be configured the same, or may be configured differently. For instance, switches 112-142 may each include respective processors, memory storing instructions and data, forwarding tables, WCMP tables, network condition data, upload data ports, download data ports, etc. However, some of the switches 102-142 may have different number of data ports than other switches, and may make different connections and be part of different routes as other switches. As such, forwarding tables, WCMP tables, network condition data stored at each of the switches 102-142 may differ with respect to the data ports, connections, and routes available at each switch.

Figure 3:
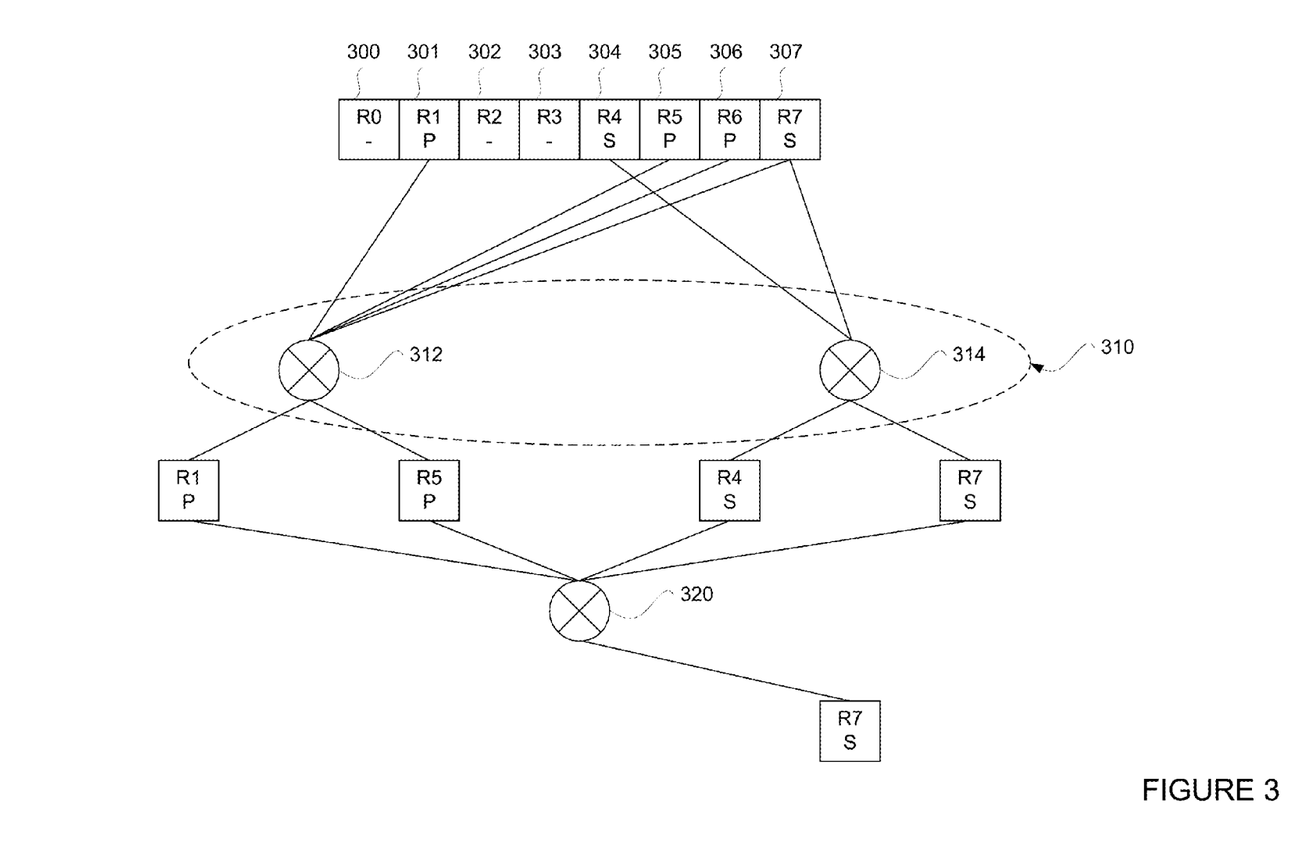
FIG. 3 illustrates an example of combined static and adaptive routing according to aspects of the technology.

FIG. 3 illustrates an example routing according to aspects of the disclosure. The example of FIG. 3 shows selections performed in two stages. The routing may be performed by any switch of a network, for example by switch 102 of network 100. For instance, the one or more processors 210 of the switch 102 may determine that a packet is to be transmitted to a destination, such as to a computing device coupled to switch 142. The packet may originate from a computing device coupled to switch 102, or may be received from another switch in the network 100.

As shown in FIGS. 2 and 3, the one or more processors 210 may determine that a plurality of ports 300-307 may be used to transmit the packet to destination switch 142. The one or more processors 210 may make such a determination by looking up the destination in a forwarding table, such as forwarding table 230. As examples, port 301 of switch 102 may be on route R1 which further includes ports of switches 112, 122, and 142; port 305 of switch 102 may be on route R5 which further includes ports of switches 116, 122, and 142; and port 306 may be on route R6 which further includes ports of switches 116, 126, and 142. Because these routes include the lowest number of hops, R1, R5, and R6 may be categorized as minimal routes or primary routes (denoted as "P"), and the corresponding ports 301, 305 and 306 may be categorized as primary ports. In contrast, port 304 may be on route R4 which further includes ports of switches 102, 114, 124, 132, and 142, and port 307 may be on route R7 which further includes ports of switches 102, 112, 124, 132, and 142. Because routes R4 and R7 require a greater number of hops than routes R1, R5, and R6, routes R4 and R7 are may be categorized as non-minimal or secondary routes (denoted as "S"), and the corresponding ports 304 and 307 may be categorized as secondary ports. In some instances, the primary ports and the secondary ports may be stored in separate lists on the switch 102 or otherwise accessible by processors 210.

The one or more processors 210 may additionally determine that one or more ports and/or routes at switch 102 are inactive. For example, processors 210 may determine that port 300 is inactive and thus route R0 including port 300 is also inactive, likewise, processors 210 may determine that ports 302 and 303, and corresponding routes R2 and R3, are also inactive. As such, processors 210 may not consider ports 302 and 303 as options for transmitting the packet.

The one or more processors 210 may select a next port to be used for transmitting the packet to destination. In this regard, the one or more processors 210 may perform one or more selections based on both static and adaptive routing parameters. For instance as shown in FIG. 3, in the first stage, the one or more processors 210 may perform a first selection 310 based on static parameters. The first selection 310 may be performed based on static weight configurations.

FIG. 4 shows an example static weight configuration in accordance with aspects of the disclosure. In particular, the configuration uses a Weighted Cost Multi Path (WCMP) flow distribution. For ease of illustration, only a few switches and connections from FIG. 1 are reproduced in FIG. 4. However, it should be understood that the static weight configuration may be performed similarly for all connections between switches in the network 100. Referring to FIG. 4, switch 112 includes connection 412 to switch 122, connection 414 to switch 124, and connection 416 to switch 126; switch 114 includes connection 422 to switch 124, connection 424 to switch 122, and connection 426 to switch 126; and switch 116 includes connection 432 to switch 126, connection 434 to switch 122, and connection 436 to switch 124.

Further, switch 112 may have 14 ports, and thus 14 links may be established between the switch 112 and the switches 122-126. Because there are three switches 122-126, and because 14 does not divide equally by 3, there may be an uneven distribution of links among the switches 122-126 (e.g., uneven striping). For example, the connection 412 between the switch 112 and the switch 122 may comprise 6 links (e.g., coupled to ports 1-6 of the switch 112), while the connections 414, 416 between the switch 112 and each of the switches 124, 126 may comprise 4 links (e.g., coupled to ports 7-10 and ports 11-14, respectively, of the switch 112).

This network topology may cause congestion in an Equal Cost Multiple Path (ECMP) flow distribution, where each connection is configured with equal static weight such that traffic is equally likely to be transmitted through each of the connections. For example, using ECMP, traffic is equally likely to transmit through the connection 412 including 6 links as the connection 414 including 4 links. Because each of the 6 links in connection 412 may have lower bandwidth than each of the 4 links in connection 414, congestion may occur at the connection 412.

Using WCMP flow distribution may ameliorate this problem and provide improved load balancing. With WCMP, each connection may be given a weight based on a number of links in the connection. For example and as shown, the connection 412 may be given a weight of 4, while the connections 414 and 416 may each be given a weight of 6. Thus, for example, 4 flows are transmitted over each of the links in connection 412, 6 flows are transmitted over each of the links in connection 414 and 6 flows are transmitted over each of the links in connection 416. In this regard, the switch 122 may avoid becoming oversubscribed, and therefore less likely to drop packets.

The weighting of the flows may be managed, for example, using a forwarding table and a WCMP table. FIG. 5 illustrates an example of the forwarding table 510 and the WCMP table 550 for switch 112. The forwarding table 510 may include a number of entries 512, 514, 516, each entry having a key and an action. The key may comprise a number of bits representing, for example, a destination address. The action may comprise information representing a next hop for each packet that is received with a destination matching a key. The WCMP table 550 may include a plurality of entries, with each entry identifying a port of the switch 112 through which received packets may be forwarded. The number of entries listing a particular port may vary depending on a weight assigned to that port. For example, the 6 links in the connection 412 coupled to ports 1-6 of the switch 112 were assigned a weight of 4, as discussed above in connection with FIG. 4. Accordingly, each of ports 1-6 may have 4 entries in the WCMP table 550. Similarly, the 4 links in the connection 414 coupled to the ports 7-10 of the switch 112 were assigned a weight of 6. Therefore, each of the ports 7-10 may have 6 corresponding entries in the WCMP table 550.

Similar forwarding tables and WCMP tables may be stored or made accessible to each of the switches in the network 100 of FIG. 1. For example, forwarding table 230 and WCMP table 240 for switch 102 may be configured similarly as forwarding table 510 and WCMP table 550 for switch 112, except forwarding table 230 stores entries for ports of switch 102 and WCMP table 240 stores weights based on connections at switch 102. In some instances where the primary ports and the secondary ports are stored in separate lists, a forwarding table and/or a WCMP table may be provided for the primary ports and another forwarding table and/or WCMP table may be separately provided for the secondary ports. While the foregoing description of FIG. 5 provides one example in which weighting of flows may be achieved, it should be understood that other hardware related weighting schemes may alternatively or additionally be used. For example, the hardware may be able to take a weight along with each port and implement a hash algorithm such that particular ports may be picked more often than others based on their weight.

Returning to FIG. 3, the result of the first selection 310 includes 4 ports—port 301 on route R1, port 305 on route R5, port 304 on route R4, and port 307 on route R7. The first selection 310 may be configured to reduce the plurality of available ports to a set of a predetermined number of ports, or a predetermined faction/percentage of ports, etc. In the particular example shown, the predetermined number of ports resulting from the first selection 310 is 4. In other examples, the result of the first selection may include fewer or more ports (or smaller or greater fraction/percentage). For example, if port selection is to be more heavily based on static weight configurations, the selection based on static weight configurations may be used to narrow down the ports to a smaller set, such as 2 or 3 ports. In contrast, if port selection is to be less heavily based on static weight configurations, the selection based on static weight configurations may be used to narrow down the ports to a larger set, such as 5 or more ports. Although the example result of the first selection 310 includes both primary ports and secondary ports, in other examples the result of the first selection 310 may include only primary ports or only secondary ports.

To ensure there are both primary ports and secondary ports in the result of the first selection 310, optionally the selection performed based on static weight configurations may be separately performed for the primary ports and the secondary ports. Thus and as further shown in FIG. 3, optionally a selection 312 may be performed based on weights assigned among the primary ports 301, 305, and 306, resulting in the selection of primary ports 301 and 305. A separate selection 314 may be performed based on weights assigned among the secondary ports 304 and 306, resulting in the selection of secondary ports 304 and 307. This way, the first selection 310 will result in both primary ports and secondary ports.

Next, in the second stage, the processors 210 may perform a second selection 320 based on adaptive parameters on the set of ports resulting from the first selection 310. FIG. 6 illustrates example adaptive routing parameters 610. The adaptive routing parameters 610 may include a plurality of entries, with each entry identifying a port of the switch 112 through which packets may be forwarded, such as ports 300-307 of FIG. 3. For each port, the corresponding route may be identified, such as routes R0-R7 of FIG. 3, as well as a length of each route, which may be considered the number of hops required to destination. Further as shown, network condition data, such as congestive data, may be provided for each route. The congestive data $c1$, $c4$, $c5$, $c6$, $c7$ may be provided in any appropriate format, such as numerical values representing the amount of traffic in front of a current data packet, percentages compared to a predetermined maximum level of congestion, or another format. For example, congestion for a particular data packet from an output port to reach destination may be calculated as $q*H$, where $q$ is the amount of queue space taken at the output port, and $H$ is the number of remaining hops to the destination. The adaptive routing parameters 610 may further include heuristic based offsets. For example, congestion for the data packet from the output port to destination may be expressed as q*H+b, where b is the offset. The offset may be based on any of a number of factors, such as those specific to a condition in a system or a network. Although FIG. 6 illustrates adaptive routing parameters 610 in a table format, the adaptive routing parameters may be provided in any format, such as logs, tables, graphs, etc.

The processors 210 may perform the second selection 320 based on these adaptive routing parameters. For instance, the processors 210 may determine an estimated latency for each route based on the length of the route, the congestive data along the route, and/or heuristic offsets for the route. By way of example, the processors 210 may determine the estimated latency for each route using a linear function of the adaptive routing parameters 610.

The processors 210 may then select the next port to transmit the packet based on latency, and may make the selection from the set resulting from the first selection 310. Thus as shown, the processors 210 may determine that route R7 has the lowest estimated latency amongst routes R1, R5, R4 and R7, and select port 307 for transmitting the packet. As also shown, where the first selection 310 resulted in a set of ports including both primary and secondary ports, the second selection 320 may be made from a set including both primary and secondary ports. Thus, a longer route may be chosen if its estimated latency is lower.

Once the next port is selected, the one or more processors 210 may route the packet through the next port. For example, the one or more processors 210 may route the packet through port 307 on its way to route R7. However, once the packet arrives on the next port of route R7, network conditions may have changed. As such, the processors of the next switch 116 on route R7 may re-evaluate the available ports and routes, and select the next port. For example, processors of the next switch 116 may perform similar selections as shown in FIG. 3, although the available ports, routes, and connections may be different. Depending on the static and/or adaptive parameters, the next port selected by the next switch 116 may or may not cause the packet to continue on route R7. For example, the next port selected by processors of switch 116 may be switch 126, thus continuing the packet's progress along route R7, or it may be switch 124, and thus changing the path of the packet to route R4. By selecting the next port after each hop, the packet may be transmitted through the optimal port and route, thereby optimizing its transmission and the overall condition of the network.

Figure 7:
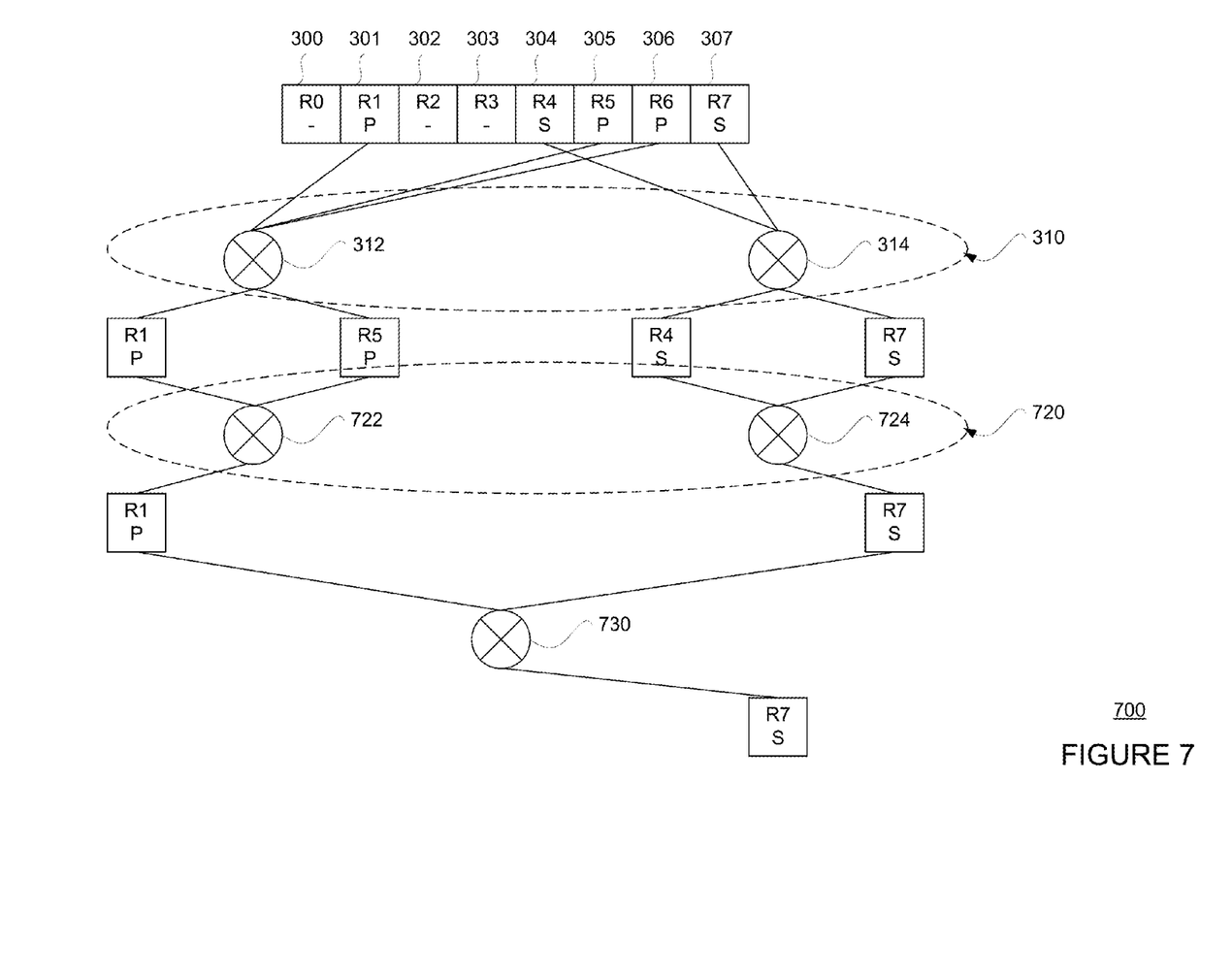
FIG. 7 illustrates another example of combined static and adaptive routing according to aspects of the technology.

FIG. 7 illustrates another example of routing packets according to aspects of the disclosure. The example of FIG. 7 shows selections performed in three stages. The routing may be performed by any switch of a network, for example by switch 102 of network 100. FIG. 7 shows many similar features as FIG. 3, which are labeled as such. However, the routing shown in FIG. 7 includes selections in three stages. In the first stage, the first selection 310 may be the same as described with reference to FIG. 3, for example based on WCMP as described with reference to FIGS. 4 and 5. Thus, a first set of ports may result from the first selection 310, which includes ports 301, 305, 304, and 307. Further, the first selection 310 may be separately performed for primary ports and secondary ports, via selections 312 and 314 as described with respect to FIG. 3.

In the second stage, the second selection 720 of FIG. 7 may be performed differently from the second selection 320 of FIG. 3. In the second selection 720, routes of equal lengths are compared against each other. Thus, where the first selection 310 resulted in a set of routes that have different lengths, those with the same lengths are compared against each other during second selection 720. For instance and as shown, selection 722 compares route R1 with route R5, each having a hop number of 3, while selection 724 compares route R4 with route R7, each having a hop number of 4. Since the lengths of routes in each comparison are equal, processors 210 may perform the second selections 722 and 724 based on only congestive conditions and/or heuristic offsets for these routes, such as described with reference to FIG. 6. The second selection 720 may be configured to reduce the plurality of available ports to a set of a predetermined number of ports, or a predetermined fraction/percentage of ports, etc. In the particular example shown, the predetermined number of ports resulting from the second selection 720 is 2 for each route length (2 ports resulting from selection 722 for routes with 3 hops and 2 ports resulting from selection 724 for routes with 4 hops). In other examples, the results of each of the second selections 722 and 724 may include fewer or more ports (or a smaller or greater fraction/percentage) than the example shown in FIG. 7.

In the third stage, the processors 210 may perform a third selection 730 on the set of ports resulting from second selection 720. In this regard, the processors 210 may determine an estimated latency for each route resulting from the second selection 720, and choose the port along the route with the lowest latency. For example, processors 210 may determine that route R7 has the lowest estimated latency amongst routes R1 and R7, and select port 307 for transmitting the packet. As compared to FIG. 3, because processors performing routing based on FIG. 7 do not need to estimate latency until the set of ports are further narrowed among routes of equal lengths, this may result in increased efficiency in determining the optimal route.

Figure 8:
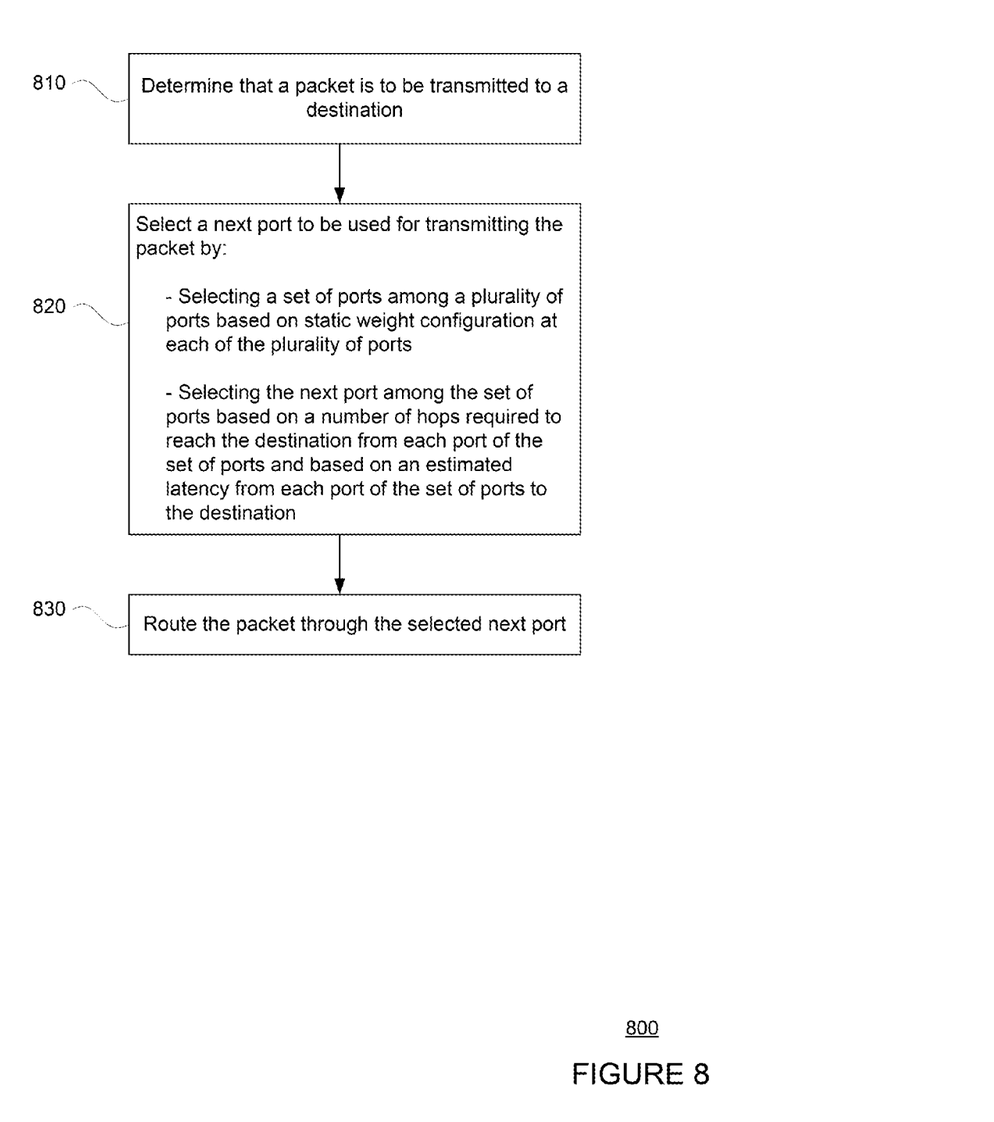
FIG. 8 is a flow diagram illustrating an example method according to aspects of the technology.

FIG. 8 is an example flow diagram 700 for routing using static and adaptive routing. Flow diagram 800 may be performed by one or more processors of one or more switch devices of FIG. 1, such as one or more processors 210 shown in FIG. 2. For example, processors 210 may receive data and make various determinations as shown in the flow diagram 800.

Referring to FIG. 8, at block 810, it is determined that a packet is to be transmitted to a destination. For example as shown in FIGS. 3 and 7, processors 210 of switch 102 may determine that a packet is to be transmitted to a computing device coupled to switch 142. The packet may originate from a computing device coupled to switch 102, or received from another switch in the network.

At block 820, a next port is selected to be used for transmitting the packet. For example and as shown in FIGS. 3 and 7, processors 210 of switch 102 may determine that a plurality of ports 300-307, each leading to a respective route R0-R7, may be used to transmit the packet. Further as shown, processors 210 may determine that one or more of the ports and/or routes may be inactive.

The selections may be performed in two stages or more stages. In a first stage, a set of ports are selected among a plurality of ports based on a static weight configuration associated with each of the plurality of ports. For instance as shown in FIGS. 3 and 7, processors 210 of switch 102 may make a first selection based on static parameters. Processors 210 may use static weight configurations as shown in FIG. 4, which may be stored in tables such as those shown in FIG. 5. Further as shown in FIGS. 3 and 7, the first selection based on static parameters may be separately performed for primary ports and secondary ports.

In a second stage, the next port is selected among the set of ports based on a number of hops required to reach the destination from each port of the set of ports and based on an estimated latency from each port of the set of ports to the destination. For instance as shown in FIGS. 3 and 7, processors 210 of switch 102 may make a second selection based on adaptive parameters. Processors 210 may consider number of hops, congestion data, and heuristics such as those shown in FIG. 6.

At block 830, the packet is routed through the selected next port. For instance as shown in FIGS. 3 and 7, the packet may be transmitted through port 307, to be transmitted through route R7. Once the packet reaches the next switch along route R7, the process of FIG. 8 may be repeated, which may result in selection of a next port that may or may not continue along route R7. Further, the process of FIG. 8 may be repeated until the packet reaches the destination.

The technology is advantageous because it provides efficient routing of packets in a network. By considering both static and adaptive routing parameters, the system may more effectively adapt to changing network conditions without losing sight of the static topology, such as link configurations downstream in the network. Further, by considering both static and adaptive routing parameters for a packet at each hop along a path to destination, routing paths for each packet may be optimized even as network conditions continue to change.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
   determining, by one or more processors, that a packet is to be transmitted to a destination;
   selecting, by the one or more processors, a next port to be used for transmitting the packet by:
      selecting, by the one or more processors, a set of ports among a plurality of ports based on at least one static network parameter; and
      selecting, by the one or more processors, the next port among the set of ports based on current network conditions; and
   routing, by the one or more processors, the packet through the selected next port,
   wherein selecting, by the one or more processors, a next port to be used for transmitting the packet comprises:
      selecting, by the one or more processors, a first set of ports among the plurality of ports based on the static weight configuration associated with each of the plurality of ports;
      selecting, by the one or more processors, a second set of ports among the first set of ports based on congestive conditions along routes requiring an equal number of hops to reach the destination; and
      selecting, by the one or more processors, the next port among the second set of ports based on an estimated latency to destination associated with each port of the second set of ports.

2. The method of claim 1, wherein the latency is estimated based on at least one of: the number of hops required to reach the destination, a network congestion condition, and one or more heuristic offsets.

3. The method of claim 1, further comprising:
   repeating, by the one or more processors, the selection of a next port at each hop of a plurality of hops until the packet reaches the destination.

4. The method of claim 1, further comprising:
   categorizing, by the one or more processors, each of the plurality of ports as a primary port or a secondary port based on a number of hops required to reach the destination.

5. A system, comprising:
   one or more processors, the one or more processors configured to:
      determine that a packet is to be transmitted to a destination;
      select a next port to be used for transmitting the packet by:
         selecting a set of ports among a plurality of ports based on at least one static network parameter; and
         selecting the next port among the selected set of ports based on current network conditions; and
      route the packet through the selected next port,
   wherein the one or more processors are configured to:
      select a first set of ports among the plurality of ports based on the static weight configuration associated with each port of the plurality of ports;
      select a second set of ports among the first set of ports based on congestive conditions along routes requiring an equal number of hops to reach the destination; and
      select the next port among the second set of ports based on an estimated latency to the destination associated with each port of the second set of ports.

6. The system of claim 5, further comprising:
   one or more memories accessible by the one or more processors, wherein information on the plurality of ports is stored in the one or more memories, wherein the one or more processors are further configured to categorize each of the plurality of ports as a primary port or a secondary port based on a number of hops required to reach the destination, and wherein the one or more memories store information on the primary ports and the secondary ports in separate lists.

7. A non-transitory computer-readable storage medium storing instructions executable by one or more processors for performing a method, comprising:
   determining that a packet is to be transmitted to a destination;
   selecting a next port to be used for transmitting the packet by:
      selecting a set of ports among a plurality of ports based on at least one static network parameter comprising a static weight configuration associated with each port of the plurality of ports whereby a weight for each port of the plurality of ports is assigned based on a number of links in a connection including the port; and selecting the next port among the set of ports based on current network conditions; and routing the packet through the selected next port, wherein selecting a next port to be used for transmitting the packet comprises:

selecting a first set of ports among the plurality of ports based on the static weight configuration associated with each port of the plurality of ports;

selecting a second set of ports among the first set of ports based on congestive conditions along routes requiring an equal number of hops to reach the destination; and    selecting the next port among the second set of ports based on an estimated latency to the destination associated with each port of the second set of ports.

8. The non-transitory computer-readable storage medium of claim 7, wherein the method further comprises:

categorizing each of the plurality of ports as a primary port or a secondary port based on a number of hops required to reach the destination.

9. The non-transitory computer-readable storage medium of claim 8, wherein selection of the set of ports is separately performed for the primary ports and the secondary ports, resulting in a set of primary ports and a set of secondary ports.

10. The non-transitory computer-readable storage medium of claim 7, wherein the method further comprises:

repeating the selection of a next port at each hop of a plurality of hops until the packet reaches the destination.

* * * * *